(12) United States Patent
Tsuchiya (10) Patent No.: US 9,578,208 B2
(45) Date of Patent: Feb. 21, 2017

(54) IMAGE PROCESSING APPARATUS

(71) Applicant: Konica Minolta, Inc., Chiyoda-ku, Tokyo (JP)

(72) Inventor: Takashi Tsuchiya, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/969,729

(22) Filed: Dec. 15, 2015

(65) Prior Publication Data

US 2016/0212303 A1 Jul. 21, 2016

(30) Foreign Application Priority Data

Jan. 20, 2015 (JP) .................................. 2015-008385

(51) Int. Cl.
 *G03F 3/08* (2006.01)
 *H04N 1/60* (2006.01)
 *G03G 15/01* (2006.01)
 *G03G 15/00* (2006.01)

(52) U.S. Cl.
 CPC ........... *H04N 1/6005* (2013.01); *G03G 15/01* (2013.01); *G03G 15/5062* (2013.01); *G03G 2215/0135* (2013.01); *G03G 2215/0164* (2013.01)

(58) Field of Classification Search
 None
 See application file for complete search history.

(56) References Cited

U.S. PATENT DOCUMENTS

2004/0004743 A1* 1/2004 Witte .................... H04N 1/401
358/504

FOREIGN PATENT DOCUMENTS

JP 2011-191918 9/2011

* cited by examiner

*Primary Examiner* — Dov Popovici
(74) *Attorney, Agent, or Firm* — Buchanan Ingersoll & Rooney PC (57) ABSTRACT

An image processing apparatus accurately compensates a flare component. An image forming apparatus reads images in a first reading condition and a second reading condition in which flare less occurs, and includes: a reflectance assignment unit for assigning a reflectance to the first image in accordance with the distance between the first image and the second image; a color information arithmetic unit for obtaining color information about the first image read in the second reading condition; a flare component derivation unit for deriving a flare component of the second image based on the reflectance and the color information; and a flare component removing unit for removing a flare component of the second image read in the first reading condition, based on the second image read in the first reading condition and the flare component derived by the flare component derivation unit.

5 Claims, 8 Drawing Sheets

IMAGE PROCESSING APPARATUS

CROSS-REFERENCE TO RELATED APPLICATIONS

The present application claims priority under 35 U.S.C. §119 to Japanese Patent Application No. 2015-008385, filed Jan. 20, 2015. The contents of this application are herein incorporated by reference in their entirety.

BACKGROUND OF THE INVENTION

Field of Invention

The present invention relates to an image processing apparatus implemented in an image forming apparatus.

Description of Related Art

Heretofore, electrophotographic image forming apparatuses are known as multi-function printer (MFP) which incorporates the functionality of multiple devices such as printers, copying machines and so forth. This type of image forming apparatus performs calibration to adjust characteristics of the image forming apparatus for the purpose of realizing optimal color reproducibility. The calibration is a process of updating the gradation characteristics including densities and the like of respective colors, i.e., C (cyan), M (magenta), Y (yellow) and K (black).

When performing calibration, a plurality of patches having different densities are used. The patch is an image formed on a sheet for use in measuring and correcting colors and optically read by a line sensor consisting of imaging devices arranged in a line.

However, depending upon the optical system, flare may be reflected on the patch. Accordingly, when the patch is greatly influenced by flare, the read value of the patch deviates from the correct value. It is considered as one of the causes of such flare generation that light reflected around the patch becomes stray light.

This can be solved, for example, by storing the flare amount when a predetermined pattern is output and compensating flare by the use of the stored flare amount (for example, refer to Japanese Patent Published Application No. 2011-191918). In accordance with the technique described in Japanese Patent Published Application No. 2011-191918, the stored flare amount is referred to in order to compensate flare disturbing the image data which is input. By this configuration, image data can be generated without influence of flare.

On the other hand, in the case where a color patch for color measurement and correction is located in the blank space bordering the printed area in which is printed user content which is changed for each printing, it cannot be estimated how much flare influences.

However, in accordance with the technique described in Japanese Patent Published Application No. 2011-191918, flare is compensated based on the flare amount obtained from the predetermined pattern. Accordingly, appropriate compensation cannot be conducted even if flare is compensated based on the flare amount obtained from the predetermined pattern. This prior art may thereby not be used to compensate influence of flare with a high degree of accuracy.

The present invention is made in order to solve such a prior art problem and used to provide an image processing apparatus capable of compensating a flare component with a high degree of accuracy.

SUMMARY OF THE INVENTION

To achieve at least one of the above-mentioned objects, reflecting one aspect of the present invention, an image processing apparatus is structured to read a first image consisting of user content and a second image consisting of a patch from a medium in a first reading condition and a second reading condition in which flare less occurs than in the first reading condition, and comprises: a reflectance assignment unit structured to assign a reflectance to the first image in accordance with the distance between the first image and the second image which are read in the second reading condition; a color information arithmetic unit structured to obtain color information about the first image which is read in the second reading condition; a flare component derivation unit structured to derive a flare component of the second image based on the reflectance assigned by the reflectance assignment unit and the color information obtained by the color information arithmetic unit; and a flare component removing unit structured to remove a flare component of the second image which is read in the first reading condition, based on the second image which is read in the first reading condition and the flare component of the second image which is derived by the flare component derivation unit.

Preferably, the image processing apparatus of the present invention further comprises an image updating unit structured to update the first image based on the second image from which the flare component is removed by the flare component removing unit, and the first image which is read in the first reading condition.

Also, in accordance with the image processing apparatus of the present invention, it is preferred that a reflection area is defined in the first image which is read in the second reading condition, wherein when the reflection area is divided into a plurality of sections, the reflectance assignment unit assigns the reflectance to each of the plurality of sections, wherein when the reflection area is divided into a plurality of sections, the color information arithmetic unit obtains the average value of the color information for each of the plurality of sections, and wherein the flare component derivation unit derives the flare component of the second image caused by the reflection area based on the reflectance and the average value of the color information in each of the plurality of sections.

Furthermore, preferably, the image processing apparatus of the present invention further comprises a positional information modification unit structured to modify the positional information of the second image to be printed on the medium when a predetermined threshold value is equal to or exceeded by a flare compensation amount of the flare component of the second image derived by the flare component derivation unit.

Still further, in accordance with the image processing apparatus of the present invention, it is preferred that the first reading condition is determined based on a first irradiation measuring system, and the second reading condition is determined based on a second irradiation measuring system which is different from the first irradiation measuring system.

DETAILED DESCRIPTION OF THE PREFERRED EMBODIMENT

In what follows, an embodiment of the present invention will be explained with reference to drawings. However, the present invention is not limited to the following embodiment.

Figure 1:
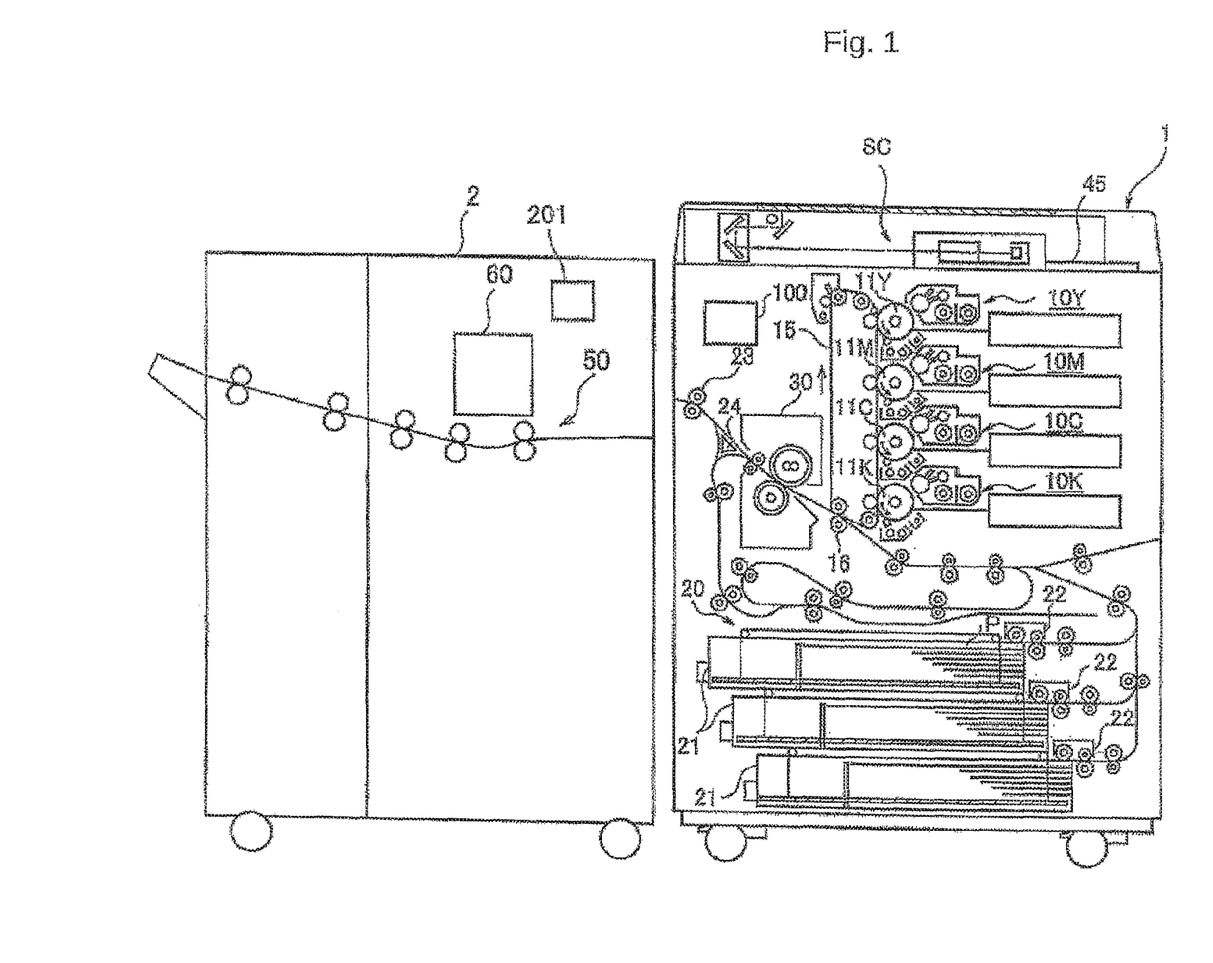
FIG. 1 is a view for schematically showing the configuration of an image forming apparatus in accordance with a present embodiment.

FIG. 1 is a view for schematically showing the configuration of an image forming apparatus in accordance with the present embodiment. This image forming apparatus is provided with a main unit 1 and a detector unit 2. The main unit 1 is provided with a control unit 100. The detector unit 2 is provided with a control unit 201.

The main unit 1 forms images, for example, by an electrophotographic system, as a so-called tandem color image forming apparatus which includes a plurality of photoreceptor drums 11Y, 11M, 11C and 11K vertically arranged in contact with one intermediate transfer belt 15 to form full-color images. The main unit 1 consists mainly of an original reading unit SC and operation panel 45, four image forming units 10Y, 10M, 10C and 10K, and a fixing unit 30.

The original reading unit SC scans and exposes the image of an original with an optical system of a scanning exposing device, and reads the reflected light therefrom with a line image sensor to obtain image signals. The image signals are processed by performing A/D conversion, shading compensation, data compression and so on, and input to the control unit 100 as read data of images. Incidentally, the image data input to the control unit 100 is not limited to the image data as captured by the original reading unit SC, but can be the data for example as received from another image forming apparatus, a personal computer or the like connected to the image forming apparatus body, or stored in a portable recording medium such as a semiconductor memory.

These four image forming units 10Y, 10M, 10C and 10K are an image forming unit 10Y for forming yellow (Y) images, an image forming unit 10M for forming magenta (M) images, an image forming unit 10C for forming cyan (C) color images, and an image forming unit 10K for forming black (K) images. The image forming units 10Y, 10M, 10C and 10K consist of photoreceptor drums 11Y, 11M, 11C and 11K respectively, each of which is provided therearound with a charging unit, an optical writing unit, a development apparatus and a drum cleaner.

The surfaces of the photoreceptor drums 11Y, 11M, 11C and 11K are uniformly charged with electricity by the charging units, and the optical writing units perform a scanning exposure process to form latent images. The development apparatuses then make visible the latent images on the photoreceptor drums 11Y, 11M, 11C and 11K respectively by developing the images with toners. Predetermined color images (toner images) are thereby formed on the photoreceptor drums 11Y, 11M, 11C and 11K respectively corresponding to yellow, magenta, cyan and black. The toner images formed on the photoreceptor drums 11Y, 11M, 11C and 11K are transferred to a predetermined location of an intermediate transfer belt 15 through first transfer rollers.

After transferred to the intermediate transfer belt 15, the toner images are transferred by a second transfer roller 16 to a recording sheet P which is conveyed with a predetermined timing by a paper feed unit 20 to be described below. The second transfer roller 16 is located in contact with the intermediate transfer belt 15 under pressure to form a nip portion therebetween.

The paper conveying unit 20 conveys recording sheets P which is fed from a paper feed unit 21 along a conveying route. In the paper feed unit 21, recording sheets P are stored in paper feed trays, extracted from the paper feed trays by paper feeding devices 22 and transferred to the conveyance route by paper feed units 22. There are a plurality of paper conveyance units in the conveying route for conveying recording sheets P. Each conveyance unit consists of a pair of rollers which are urged against each other. At least one of the pair of rollers is rotated by a drive mechanism consisting of an electric motor. Meanwhile, in place of a pair of rollers, any other appropriate combination such as a combination of belts, a combination of a belt and a roller or the like combination can be generally used as a pair of rotary members serving as a conveyance unit.

The fixing unit 30 is an apparatus which performs a fixing process for a recording sheet P to which an image has been transferred. The fixing unit 30 consists, for example, of a pair of fixing rollers urged against each other to form a fixing nip portion therebetween, and a heater for heating one or both of the fixing rollers. This fixing unit 30 fixes an image to a recording sheet P under the pressure applied between the pair of fixing rollers and the heat applied through the fixing rollers. After the fixing unit 30 processes the recording sheet P by the fixing treatment, the recording sheet P is discharged outwards by discharging rollers 23.

In the case where an image is to be formed also on the back side of a recording sheet P, the recording sheet P with the image formed on the front side is conveyed to a refeed conveying route through a switching gate 24. The refeed conveying route includes reversing rollers which hold the tail end of the conveyed recording sheet P and then reverses the recording sheet P by sending back it to reverse the front and back sides of the recording sheet P. After reversing the front and back sides, the recording sheet P is conveyed by a plurality of conveyance rollers and joined with a conveying route in the upstream side of the transfer site for the purpose of supplying the recording sheet P to form an image on the other side.

The operation panel 45 is an input unit in the form of a touch panel through which information can be input in accordance with information displayed on a display which is not shown in the figure. A user can set a variety of parameters such as information about recording sheet P, i.e., the density and reduce/enlarge ratio of images and selection of a paper tray to be used as a paper supply source by operating the operation panel 45. These settings are acquired by the control unit 100. Also, the operation panel 45 is controlled by the control unit 100 and functions also as a display unit through which the user can be informed of various items of information for reference.

The detector unit 2 is located in the downstream side of the main unit 1. In addition to the control unit 201, the detector unit 2 is provided with a paper conveying unit 50 and an image reading unit 60. The paper conveying unit 50 includes a conveying route for conveying a recording sheet P fed from the main unit 1, and discharging the recording sheet P outwards.

For example, after receiving a recording sheet P supplied from the main unit 1, the detector unit 2 detects the image formed on the recording sheet P. The detection result of the image is output to the control unit 201 of the detector unit 2. As discussed below, the control unit 201 performs various types of processing based on the detection result of the image. Also, the control unit 201 is capable of communicating the control unit 100 of the main unit 1 to exchange various data.

The image reading unit 60 is located to face a recording sheet P, which is conveyed on the conveying route, and read the image formed on a recording sheet P. The image reading unit 60 consists of a light source for irradiating a recording sheet P which is passed through a reading position, and a line image sensor consisting of a plurality of imaging devices 91 which are linearly arranged in the sheet width direction to photoelectrically convert light reflected from the recording sheet P in correspondence with picture elements respectively. The reading area of the image reading unit 60 is determined to cover the maximum width of recording sheets P which can be transferred from the main unit 1. The image reading unit 60 reads the image formed on a sheet as a two-dimensional image P by repeating operation of reading image data from one line along the sheet width direction in synchronization with the operation of conveying the recording sheet P which is passed through the reading position. The image, which is read, is generated as read image data and output to the control unit 201 or the control unit 100.

The control unit 100 controls the operation of the main unit 1. The control unit 100 is implemented with a microcomputer which consists mainly of a CPU, a ROM, a RAM, and an I/O interface. The control unit 100 controls the image forming operation of the main unit 1. The control unit 100 can control the image detection operation of the detector unit 2.

The control unit 201 controls the operation of the detector unit 2. The control unit 201 is implemented with a microcomputer which consists mainly of a CPU, a ROM, a RAM, and an I/O interface. The control unit 201 controls the image detection operation and the image processing operation of the detector unit 2. The control unit 201 can control various operations in operative association with the main unit 1.

Figure 2:
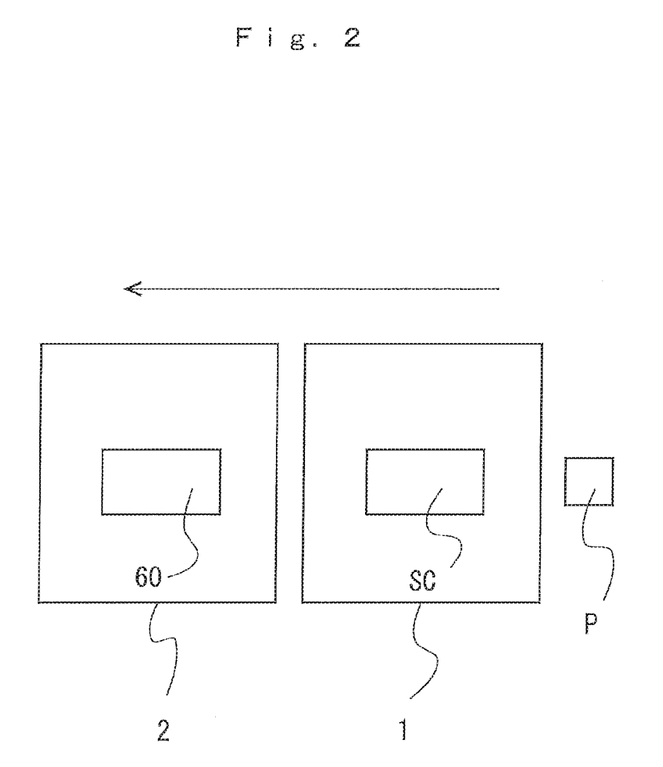
FIG. 2 is a view for schematically explaining an example of a direction in which a recording sheet P is conveyed in the image forming apparatus.

FIG. 2 is a view for schematically explaining an example of a direction in which a recording sheet P is conveyed in the image forming apparatus. As illustrated in FIG. 2, the image forming apparatus has the main unit 1 in the upstream side of the detector unit 2. The image forming apparatus is configured to operate as either an in-line system or an offline system.

The in-line system provides a configuration in which the detector unit 2 is directly fed with a recording sheet P which is discharged from the main unit 1 and on which an image is formed. On the other hand, the offline system provides a configuration in which the detector unit 2 is not directly fed with a recording sheet P which is discharged from the main unit 1 and on which an image is formed, but the main unit 1 and the detector unit 2 are designed independently from each other. The following explanation is based on the assumption that an in-line system is used. However, an offline system can be used instead.

A recording sheet P is first read by the original reading unit SC of the main unit 1. The recording sheet P is then read by the detector unit 2. In this case, the image reading unit 60 of the detector unit 2 reads the recording sheet P in a first reading condition. On the other hand, the original reading unit SC of the main unit 1 reads the recording sheet P in a second reading condition in which flare less occurs than in the first reading condition. In the second reading condition of the main unit 1, if it is an ideal reading condition, no flare occurs. This condition can be realized by the use of an optical system made of a material which can absorb stray light and the like.

Namely, the first reading condition is determined by the optical system of the image reading unit 60, i.e., a first irradiation measuring system, and the second reading condition is determined by the optical system of the original reading unit SC, i.e., a second irradiation measuring system.

With these different irradiation measuring systems, since flare less occurs in the second reading condition than in the first reading condition, unnecessary light scattering is lessened in the environment. Accordingly, the read data of user content 303 comes to the true intensity level. More appropriate flare components can be obtained by the use of the read data of user content 303, which is read in the second reading condition, as compared with the prior art technique.

In this case, the recording sheet P is a medium carrying a first image and a second image. The printing positions where the first image and the second image are printed on the recording sheet P will be described below with reference to FIGS. 4 and 5. The first image consists of the user content 303, and the second image consists of the patch 311. The user content 303 is content defined by a user and printed as the first image on the recording sheet P which is a medium.

The patch 311 is printed with the color components of the main unit 1 by superimposing all the chromatic colors in constant proportions while the density of each chromatic color is changed in steps. For example, in the case where the color components of the printer are C (cyan), M (magenta), Y (yellow) and K (black), the patch 311 is formed of chromatic colors, i.e., C (cyan), M (magenta) and Y (yellow), except K (black), as combined by varying the densities thereof from 0% to 100% respectively.

Figure 3:
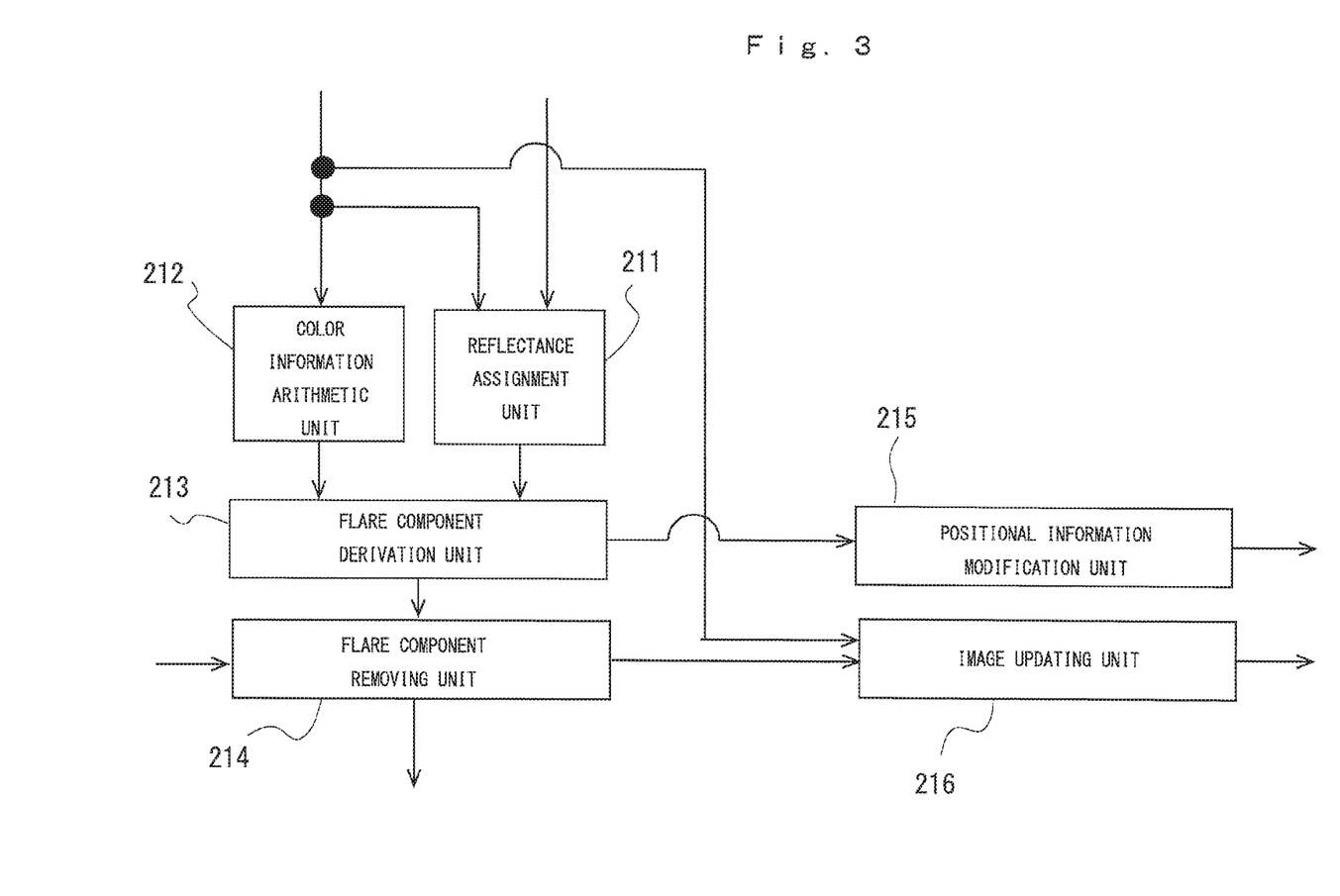
FIG. 3 is a view showing one example of the functional configuration of the image processing apparatus implemented in the image forming apparatus.
Figure 4:
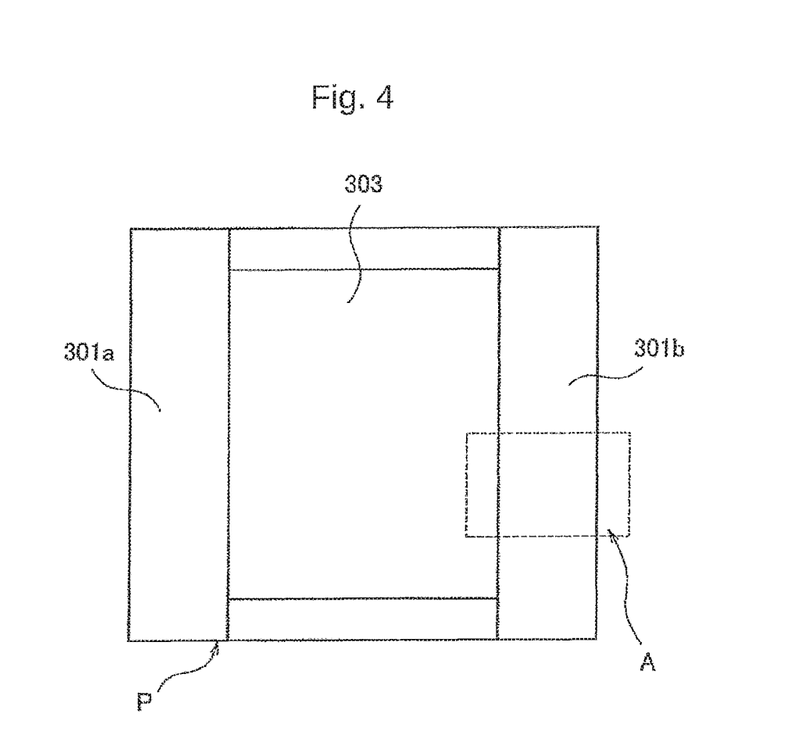
FIG. 4 is a view for explaining a printing area of a recording sheet P.
Figure 5:
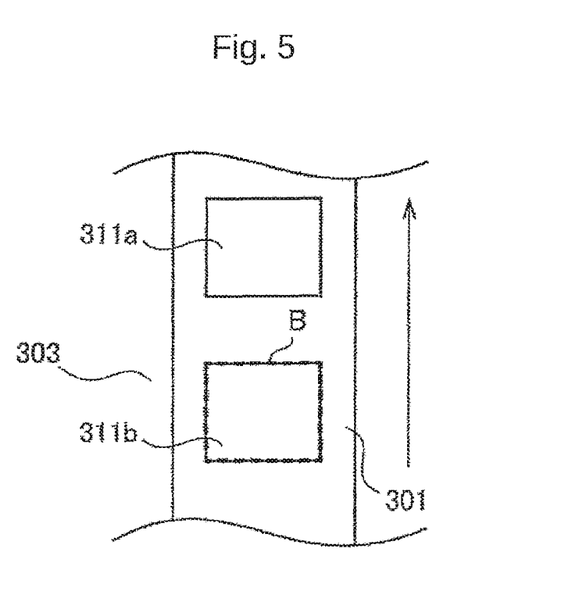
FIG. 5 is a partial enlarged view of portion A shown in FIG. 4.
Figure 6:
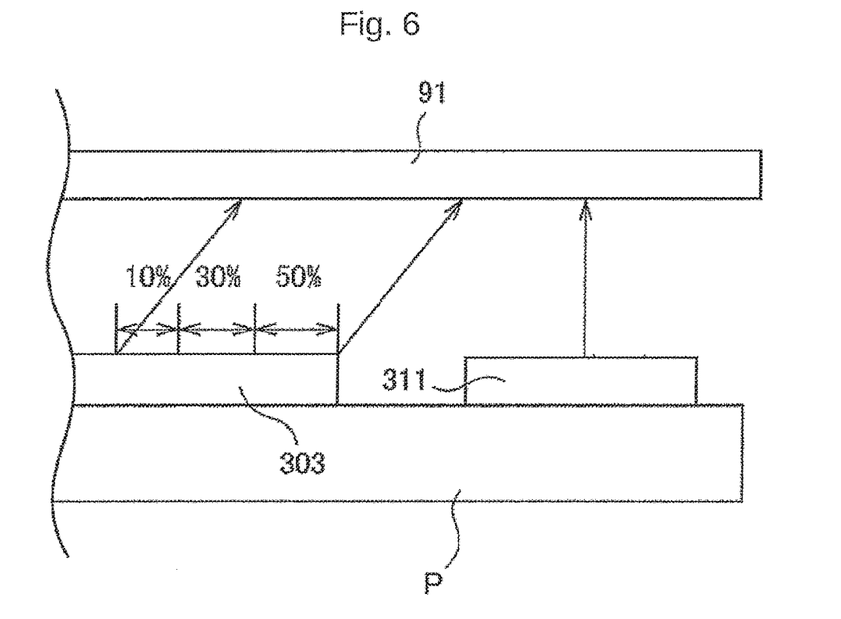
FIG. 6 is a view showing one example of assignment of a reflectance to each section of reflection area in the user content 303 of the recording sheet P.
Figure 7:
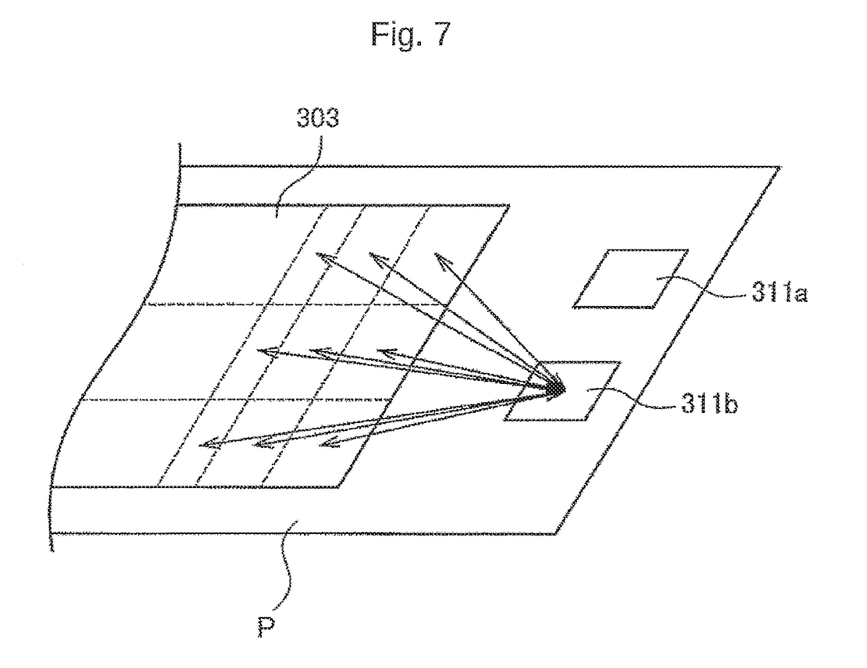
FIG. 7 is a view for explaining the distance relationship on the recording sheet P between each section of the reflection area of the user content 303 and the patch 311 of the blank space 301.

FIG. 3 is a view showing one example of the functional configuration of the image processing apparatus implemented in the image forming apparatus. FIG. 4 is a view for explaining is a chart explaining the printing area of a recording sheet P. FIG. 5 is a partial enlarged view of portion A shown in FIG. 4. FIG. 6 is a view showing one example of assignment of a reflectance to each section of reflection area in the user content 303 of the recording sheet P. FIG. 7 is a view for explaining the distance relationship on the recording sheet P between each section of the reflection area of the user content 303 and the patch 311 of the blank space 301.

As illustrated in FIG. 3, the image processing apparatus is provided with a reflectance assignment unit 211, a color information arithmetic unit 212, a flare component derivation unit 213, a flare component removing unit 214. The image processing apparatus is provided also with a positional information modification unit 215, and an image updating unit 216. Meanwhile, the reflectance assignment unit 211, the color information arithmetic unit 212, the flare component derivation unit 213, the flare component removing unit 214, the positional information modification unit 215 and the image updating unit 216 may be implemented in either the control unit 100 or the control unit 201.

The reflectance assignment unit 211 serves to assign reflectances of the user content 303 in accordance with the distance between the patch 311 and the user content 303. At this time, in advance of explaining the positional relationship between the patch 311 and the user content 303, the recording sheet P will be explained. The recording sheet P, as illustrated in FIG. 4, carries the user content 303 printed approximately in the center position thereof. There are blank spaces 301a and 301b in the right and left sides of the user content 303. Incidentally, unless particular one of the blank spaces 301a and 301b is specified, the blank space is referred to simply as the blank space 301.

The portion A of FIG. 4 will be explained in detail with reference to FIG. 5. As illustrated in FIG. 5, patches 311a and 311b are printed on the blank space 301 of the recording sheet P. When the recording sheet P is conveyed upward from the bottom of the sheet, for example, the area in a frame B has to be read so that the patch 311b is detected by the imaging device 91 to be described below. In this case, the user content 303 includes an area which could influence the imaging device 91 which is reading the patch 311b. If such an area is set as the reflection area, it corresponds to an area which emits reflected light having influence of the user content 303 on the imaging device 91. The image processing apparatus thereby reads the recording sheet P in advance by the use of the main unit 1 to measure the reflection area of the user content 303 and save its measurement result.

Generally speaking, flare occurs because of scattered light in an irradiation measuring system. The intensity of the scattered light is diminished with the distance. Accordingly, the flare component increases as the intensity of input light increases. Assuming occurrence of flare, therefore, it is necessary to make compensation in accordance with the distance relationship between the user content 303 and the patch 311. The reflection area of the user content 303 is thereby set up. As has been discussed above, the reflection area is a surface area of the user content 303 which reflects light and influences the imaging device 91 which is reading the patch 311. First, the reflection area of the user content 303 is divided into a plurality of sections. Next, weighting on the reflectance is performed in accordance with the distance between each section and the patch 311. Appropriate reflectances can thereby be assigned to the user content 303 in an accurate manner.

For example, as illustrated in FIG. 6, a greater reflectance is assigned to a section of the reflection area of the user content 303 as this section is located closer to the patch 311, so that appropriate reflectances can be assigned in an accurate manner. In the case of the example shown in FIG. 6, as the section of the reflection area of the user content 303 as this section is located closer to the patch 311, a greater reflectance is assigned as 10%, 30% and 50%.

Namely, the reflectance is set up as the degree of contribution of reflected light to the influence of the user content 303 on the imaging device 91 by assigning a reflectance to each section in accordance with the distance between the center of the each section and the patch 311 as illustrated in FIG. 7.

In this case, specifically describing, the imaging device 91 is a CCD (Charge Coupled Device). The CCD is an optical sensor capable of reading an image on a recording sheet P in a reading position, and a plurality of CCDs are arranged in a line as a color line sensor capable of reading the full-width range of the recording sheet P in the width direction. Also, when performing reading operation in practice, the imaging device 91 is driven in operative association with an optical system and an LED (Light Emitting Diode) as a light source (which are not shown in the figure). The optical system is provided for directing the image in the reading position to the CCDs, and consists of a plurality of mirrors and a plurality of lenses.

Incidentally, of the plurality of imaging device 91 arranged in a line, the imaging devices 91 responsible for reading the patch 311 receives light reflected from the patch 311 together with light reflected from the reflection area of the user content 303, and therefore the read data of the patch 311 deviates from the correct value. The read data of the patch 311 thereby contains a flare component.

FIG. 3 is referred to again. The reflectance assignment unit 211 serves to assign reflectances based on information about the user content 303 and information about the patch 311. Specifically, as has been discussed above, the reflectance assignment unit 211 assigns reflectances to the user content 303 in accordance with the distance between the user content 303 and the patch 311. In this case, the reflection area is defined on the user content 303 which is read in the main unit 1 in which flare less occurs. While a plurality of sections are defined in the reflection area, therefore, the reflectance assignment unit 211 assigns a reflectance to each of the plurality of sections. The reflectance thereby depends upon the optical system, i.e., the irradiation measuring system, and more specifically speaking, the reflectance varies depending upon the imaging device 91, the user content 303 and the patch 311.

The color information arithmetic unit 212 obtains color information of the user content 303 which is read in the main unit 1 in which flare less occurs. While a plurality of sections are defined in the reflection area of the user content 303, the color information arithmetic unit 212 obtains the average value of the color information of each section. The color information is, for example, the brightness obtained from the read data of the image of the user content 303 which is read in the main unit 1. Specifically, the color information arithmetic unit 212 acquires RGB values of the user content 303 and performs HSV conversion of these values to obtain the brightness. Also, the color information arithmetic unit 212 obtains the average value of brightness in each section of the reflection area of the user content 303. The brightness is thereby depending upon the user content 303, and obtained from the density of the user content 303.

The flare component derivation unit 213 derives the flare component of the patch 311 based on the reflectances assigned by the reflectance assignment unit 211 and the color information obtained by the color information arithmetic unit 212. Specifically, the flare component derivation unit 213 derives the flare component of the patch 311 based on the reflectance and the average value of the color information in each of the plurality of sections defined in the reflection area of the user content 303.

As explained above, while flare occurs from scattered light in an irradiation measuring system, the intensity of flare is diminished as the distance increases. On the other hand, as the brightness of the subject, i.e., the reflection area of the user content 303 increases, more flare can occurs from ghosts or stray light. It is therefore possible to accurately derive the flare component, in an irradiation measuring system in which flare less occurs, based on the average value of the color information of the user content 303 and the reflectance determined in accordance with the distance between the user content 303 and the patch 311 with respect to each section of the reflection area which is set up by taking into consideration occurrence of flare.

In other words, since flare component is derived based on the read data of the image which is read in a reading condition in which less or ideally no flare occurs, accurate flare component can be derived.

It is therefore possible to obtain accurate flare component by deriving them by the image processing apparatus based on the read data of the user content 303 which is read in a reading condition in which less flare occurs.

In this case, the flare component corresponding to a patch 311 can be obtained by creating a compensation table in which a flare component is associated with parameters, i.e., the average value of brightness and the reflectance, and referring to this compensation table after reading the patch 311.

The flare component removing unit 214 removes the flare component of the patch 311 read by the detector unit 2 based on the flare component of the patch 311 derived by the flare component derivation unit 213 and the patch 311 read by the detector unit 2. Specifically, the flare component removing unit 214 derives the desired read data of the patch 311 by subtracting the flare component from the read data of the patch 311 read by the detector unit 2.

The flare component can accurately be removed by this process. Incidentally, this calculation result can be used for various arithmetic operations by storing the calculation result in the compensation table as described above.

The positional information modification unit 215 modifies the positional information of a patch 311 to be printed on a recording sheet P when a predetermined threshold value is equal to or exceeded by the flare compensation amount of the flare component of the patch 311 derived by the flare component derivation unit 213. Specifically, when the influence of the flare component is greater than or equal to the threshold value which is designated by a user or the like, the positional information modification unit 215 modifies the positional information of the patch 311 on the recording sheet P in order that the patch 311 is printed in a position distant from a place greatly influenced by flare such as a place with much white and without printing.

The image updating unit 216 updates the user content 303 based on the patch 311 from which the flare component is removed by the flare component removing unit 214 and the user content 303 read by the detector unit 2. Specifically, the image updating unit 216 performs appropriate compensation on the user content 303 based on the density of the patch without the flare component. By this configuration, the read data of the user content 303 can be fed back while suppressing the influence of flare.

Figure 8:
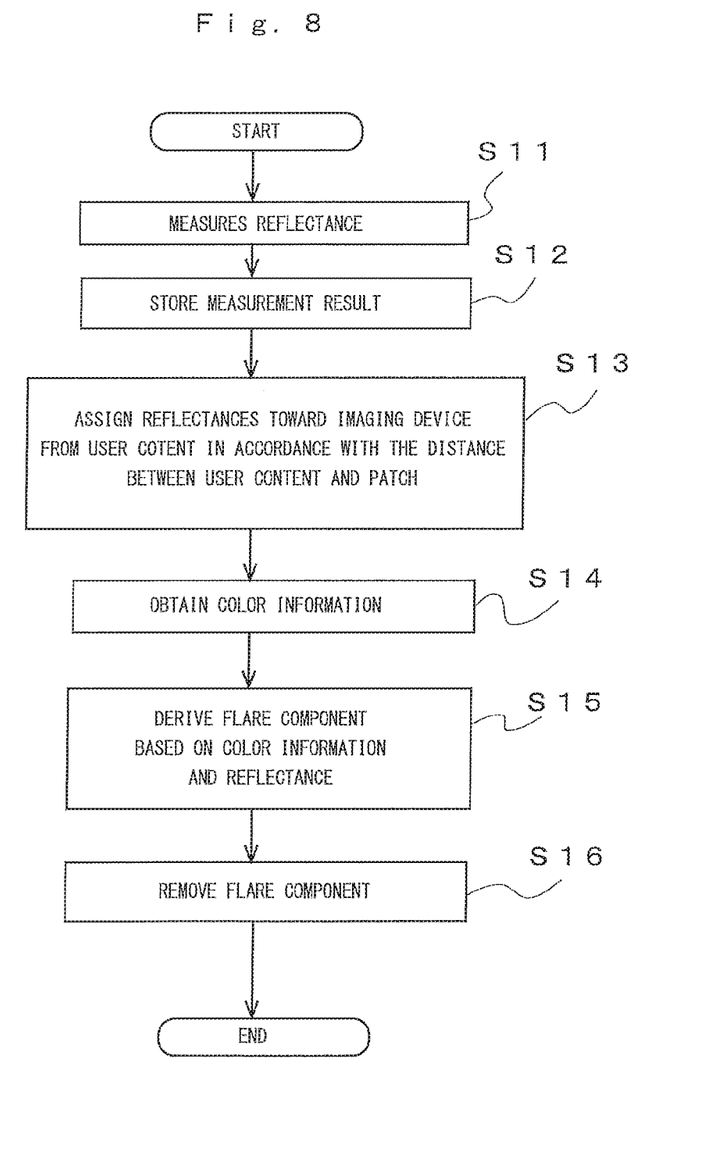
FIG. 8 is a flow chart for explaining an exemplary operation of the image processing apparatus.

FIG. 8 is a flow chart for explaining an exemplary operation of the image processing apparatus. The main unit 1 measures the reflectance and store the measurement result (step S11, S12). Specifically, as a preliminary operation, the main unit 1 reads the user content 303 and the patches 311, measures the read data of the user content 303 and the read data of the patches 311 as the reflectance to the imaging device 91, and stores the measurement result.

Specifically, while the read data of the user content 303 and the read data of the patches 311 are obtained as RGB values, these RGB values can be used to obtain the density of the image, i.e., the brightness of the image. The brightness of an image and the reflectance of the image have a certain correlation, and therefore the reflectance can be obtained from the brightness of the image. Also, as a preliminary operation, the main unit 1 acquires the read data of the user content 303 and store the read data which is acquired.

The reflectance assignment unit 211 assigns the reflectances of the user content 303 toward the imaging device 91 from the user content 303 in accordance with the distance between the user content 303 and the patch 311 (step S13). Specifically, the reflectance assignment unit 211 assigns a reflectance to each section defined in the reflection area of the user content 303 in accordance with the distance between the user content 303 and the patch 311.

The color information arithmetic unit 212 obtains color information (step S14). Specifically, the color information arithmetic unit 212 calculates a brightness by HSV converting the read data, i.e., RGB values of the user content 303 read in the main unit 1. The color information arithmetic unit 212 makes use of the calculated brightness as color information. Furthermore, the color information arithmetic unit 212 calculates the average value of the brightness for each section defined in the reflection area of the user content 303.

The flare component derivation unit 213 derives flare component based on the color information and the reflectance (step S15). Still further, the flare component derivation unit 213 creates a compensation table in which a flare component is associated with the average value of brightness and the reflectance. In this case, the flare component derivation unit 213 associates the derived flare component and the read data of the patch 311 corresponding to the derived flare component with each other.

The flare component removing unit 214 removes the flare component (step S16). In this case, the flare component removing unit 214 acquires compensation data from the compensation table, i.e., the corresponding flare component by referring to the read data of the patch 311, and removes the flare component based on the acquired flare component and the read data of the patch 311.

Meanwhile, step S13 and step S14 are not necessarily performed one after another but can be performed concurrently. Also, step S14 can be performed in advance of step S13.

Figure 9:
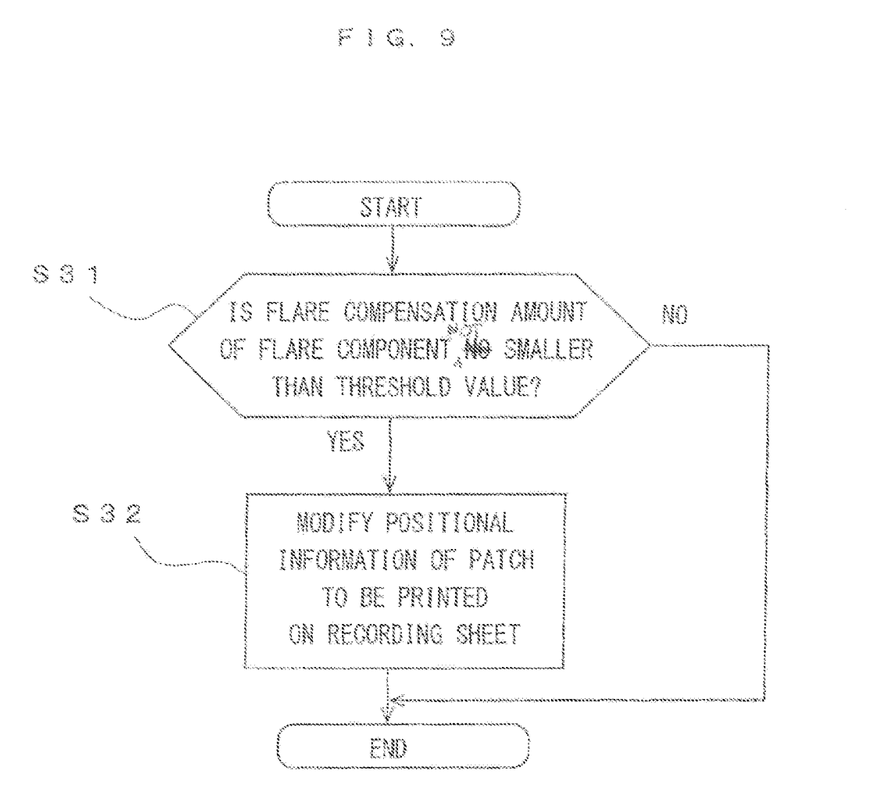
FIG. 9 is a flow chart for explaining another exemplary operation of the image processing apparatus.

FIG. 9 is a flow chart for explaining another exemplary operation of the image processing apparatus. The positional information modification unit 215 determines whether or not the flare compensation amount of the flare component is not smaller than a threshold value (step S31). If the flare compensation amount of the flare component is no smaller than the threshold value (YES in step S31), the positional information modification unit 215 modifies the positional information of the patch 311 to be printed on the recording sheet P (step S32). Conversely, if the flare compensation amount of the flare component is smaller than the threshold value (NO in step S31), the positional information modification unit 215 does not modify the positional information of the patch 311 to be printed on the recording sheet P.

As has been discussed above, the image processing apparatus can derive the flare component caused by a first image based on this first image which is read in the second reading condition in which flare less occurs than in the first reading condition. Accordingly, a flare component and a non-flare component are not distinguished in the same reading condition as the read data of an image is read while flare occurring. Specifically, a flare component and a non-flare component are distinguished from each other by comparing the flare component derived from the first image which is read in the second reading condition in which flare less occurs than in the first reading condition, with the read data of the second image which is read in the first reading condition and disturbed by a flare component. The flare component disturbing the second image can thereby be removed by removing such a flare component. By this configuration, the flare component can accurately be compensated.

In other words, accurate compensation can be performed by deriving and obtaining the flare component in an environment in which less flare occurs as compared with the case where the flare component is extracted and obtained in an environment in which flare occurs.

Also, since the flare component is derived from the user content 303, even if the user content 303 is changed, the flare component is derived from the user content 303 which is changed. The image processing apparatus can thereby perform compensation with a higher degree of accuracy than when the flare component is extracted and obtained based on a predetermined pattern.

Furthermore, based on the second image from which the flare component is removed and the corresponding first image, the image processing apparatus updates the corresponding first image. The corresponding first image is thereby updated by referring to the second image from which the flare component is removed, and therefore the first image can be stored in a condition without a disturbing flare component.

Also, in the case of the above image processing apparatus, a reflection area is set up in an image. Furthermore, the reflection area is divided into a plurality of sections. The image processing apparatus assigns reflectances to the plurality of sections respectively in order to determine the reflectance for each section. The image processing apparatus obtains the average value of color information in each of the plurality of sections. The image processing apparatus derives the flare component caused by the reflection area based on the reflectance and the average value of color information for each of the plurality of sections. Accordingly, the image processing apparatus can derive an accurate flare component by assigning a reflectance to each section of the reflection area.

Also, when the flare compensation amount of the flare component is not smaller than a predetermined threshold value, the image processing apparatus modifies the positional information of the image to be printed on the recording sheet P for use in measuring and correcting colors, i.e., the positional information of the patch 311. It is therefore possible to change the printing position of the image, i.e., the patch 311 when the influence of flare is considerable.

Also, the image forming apparatus reads the medium carrying the user content 303 and the patch 311 in the first reading condition and the second reading condition in which flare less occurs than in the first reading condition. It is therefore possible to perform compensation with a particularly higher degree of accuracy by removing the flare component derived based on the read data of the user content 303 which is read in the second reading condition in which flare less occurs than in the first reading condition.

Also, the image processing apparatus does not make use of the same irradiation measuring system for compensating the flare component. The image processing apparatus makes use of an image which is read in the second reading condition determined based on the second irradiation measuring system which is different than the first irradiation measuring system. In this case, the second reading condition is a condition in which less flare occurs than the first reading condition. Accordingly, a flare component and a non-flare component are not distinguished in the same environment as the read data of an image is read while flare occurring.

The flare component is removed by the use of the flare component derived from the first image which is read in the second irradiation measuring system in which flare less occurs than in the first irradiation measuring system, and distinguishing a flare component and a non-flare component from each other contained in the image which is read in the first irradiation measuring system. By this configuration, since the flare component is removed based on the read data of the image which is read in an irradiation measuring system in which flare less occurs, it is therefore possible to perform flare compensation with a particularly higher degree of accuracy.

As has been discussed above, in accordance with the present embodiment, the image processing apparatus is structured to read a first image consisting of the user content 303 and a second image consisting of the patch 311 from a medium in a first reading condition and a second reading condition in which flare less occurs than in the first reading condition, and comprises: the reflectance assignment unit 211 structured to assign a reflectance to the first image in accordance with the distance between the first image and the second image which are read in the second reading condition; the color information arithmetic unit 212 structured to obtain color information about the first image which is read in the second reading condition; the flare component derivation unit 213 structured to derive a flare component of the second image based on the reflectance assigned by the reflectance assignment unit 211 and the color information obtained by the color information arithmetic unit 212; and the flare component removing unit 214 structured to remove a flare component of the second image which is read in the first reading condition, based on the second image which is read in the first reading condition and the flare component of the second image which is derived by the flare component derivation unit 213. By this configuration, the flare component can accurately be removed.

The image processing apparatus further comprises the image updating unit 216 structured to update the first image based on the second image from which the flare component is removed by the flare component removing unit 214, and the first image which is read in the first reading condition. Accordingly, by referring to the image from which the flare component is removed, the corresponding image can be updated and stored in a condition without a disturbing flare component.

While a reflection area is defined in the first image which is read in the second reading condition, when the reflection area is divided into a plurality of sections, the reflectance assignment unit 211 assigns the reflectance to each of the plurality of sections. Also, when the reflection area is divided into a plurality of sections, the color information arithmetic unit 212 obtains the average value of the color information for each of the plurality of sections. The flare component derivation unit 213 derives the flare component of the second image caused by the reflection area based on the reflectance and the average value of the color information in each of the plurality of sections. Accordingly, it is possible to derive an accurate flare component by assigning a reflectance to each section of the reflection area.

The image processing apparatus further comprises the positional information modification unit 215 structured to modify the positional information of the second image to be printed on the medium when a predetermined threshold value is equal to or exceeded by a flare compensation amount of the flare component of the second image derived by the flare component derivation unit 213. It is therefore possible to change the printing position of the image for use in compensation when the influence of flare is considerable.

Also, the first reading condition is determined based on the first irradiation measuring system, and the second reading condition is determined based on the second irradiation measuring system which is different from the first irradiation measuring system. By this configuration, since the flare component is removed based on the read data of the image which is read in an irradiation measuring system in which flare less occurs, it is therefore possible to perform flare compensation with a particularly higher degree of accuracy.

The image processing apparatus have been explained based on the embodiments in accordance with the present invention. However, it is not intended to limit the present invention to the precise form described, and obviously many modifications and variations are possible without departing from the scope of the invention.

Figure 10:
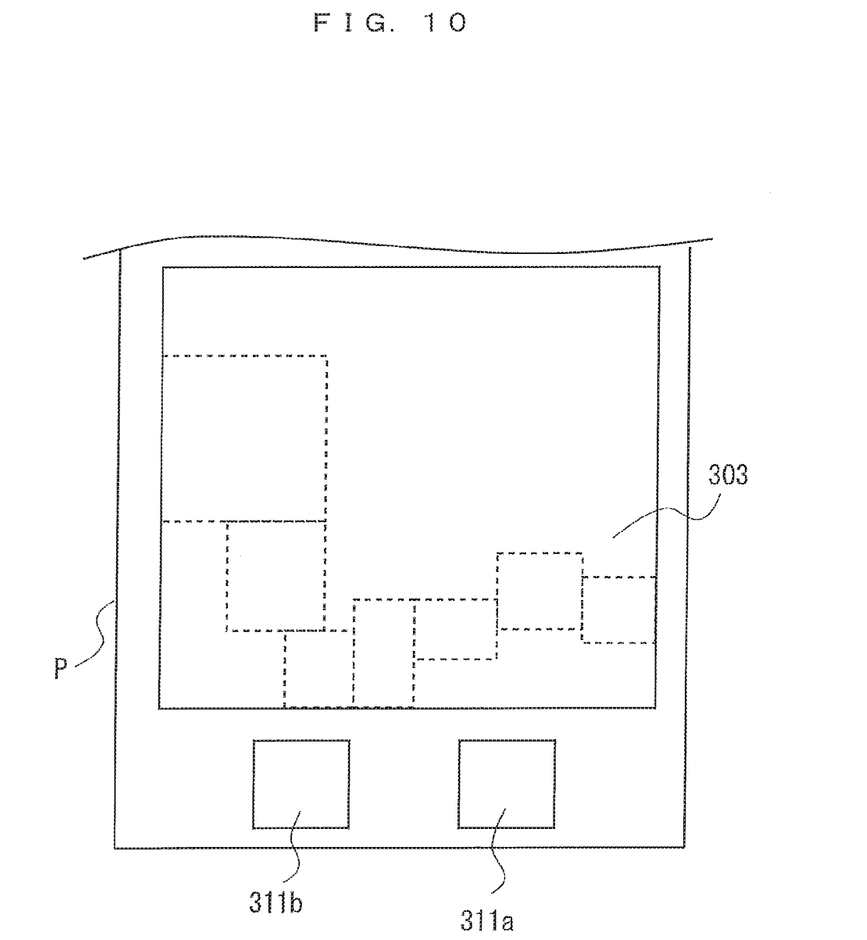
FIG. 10 is a schematic diagram for showing another example of the configuration of sections into which the reflection area of the user content 303 of the recording sheet P is divided.

For example, while the reflection area of the user content 303 is divided into the plurality of latticed sections in the above example, the present invention is not limited to this structure but can be applied to another configuration of sections as shown in FIG. 10. FIG. 10 is a schematic diagram for showing another example of the configuration of sections into which the reflection area of the user content 303 of the recording sheet P is divided. The sections as shown in FIG. 10 are not in a lattice-like form as in the above example. As illustrated in FIG. 10, of the reflection area of the user content 303, particular sections which can substantially influence the imaging device 91 are determined as the sections of the reflection area. In this case, an interface for determining the sections can be provided in the operation panel 45 through which a user can determine the sections of the reflection area, for example, as illustrated in FIG. 10. Alternatively, the section determination process such as illustrated in FIG. 10 can be automatically performed in the case where the user content 303 includes an area which has a low density and greater reflected light.

Also, while an in-line system is used in the case of the present embodiment, the present invention is not limited thereto but can be applied to an off-line system.

Furthermore, while the reflectances are 10%, 30%, 50% in the above example, the present invention is not limited thereto but can be applied to the system in which other reflectances different than those values are assigned to the sections respectively.

Still further, while the imaging device 91 consists of CCDs in the above example, the present invention is not limited thereto but CISs, CMOSs or the like can be used for the same purpose.

What is claimed is:

1. An image processing apparatus structured to read a first image consisting of user content and a second image consisting of patches from a medium in a first reading condition and a second reading condition in which flare less occurs than in the first reading condition, said image processing apparatus comprising:

a reflectance assignment unit structured to assign a reflectance to the first image in accordance with a distance between the first image and the second image which are read in the second reading condition;

a color information arithmetic unit structured to obtain color information about the first image which is read in the second reading condition;

a flare component derivation unit structured to derive a flare component of the second image based on the reflectance assigned by the reflectance assignment unit and the color information obtained by the color information arithmetic unit; and a flare component removing unit structured to remove a flare component of the second image which is read in the first reading condition, based on the second image which is read in the first reading condition and the flare component of the second image which is derived by the flare component derivation unit.

2. The image processing apparatus of claim 1 further comprising an image updating unit structured to update the first image based on the second image from which the flare component is removed by the flare component removing unit, and the first image which is read in the first reading condition.

3. The image processing apparatus of claim 1 wherein a reflection area is defined in the first image which is read in the second reading condition, wherein when the reflection area is divided into a plurality of sections, the reflectance assignment unit assigns the reflectance to each of the plurality of sections, wherein when the reflection area is divided into the plurality of sections, the color information arithmetic unit obtains an average value of the color information for each of the plurality of sections, and wherein the flare component derivation unit derives the flare component of the second image caused by the reflection area based on the reflectance and the average value of the color information in each of the plurality of sections.

4. The image processing apparatus of claim 1 further comprising a positional information modification unit structured to modify positional information of the second image to be printed on the medium when a predetermined threshold value is equal to or exceeds by a flare compensation amount of the flare component of the second image derived by the flare component derivation unit.

5. The image processing apparatus of claim 1 wherein the first reading condition is determined based on a first irradiation measuring system, and the second reading condition is determined based on a second irradiation measuring system which is different from the first irradiation measuring system.

* * * * *